Figure 1:
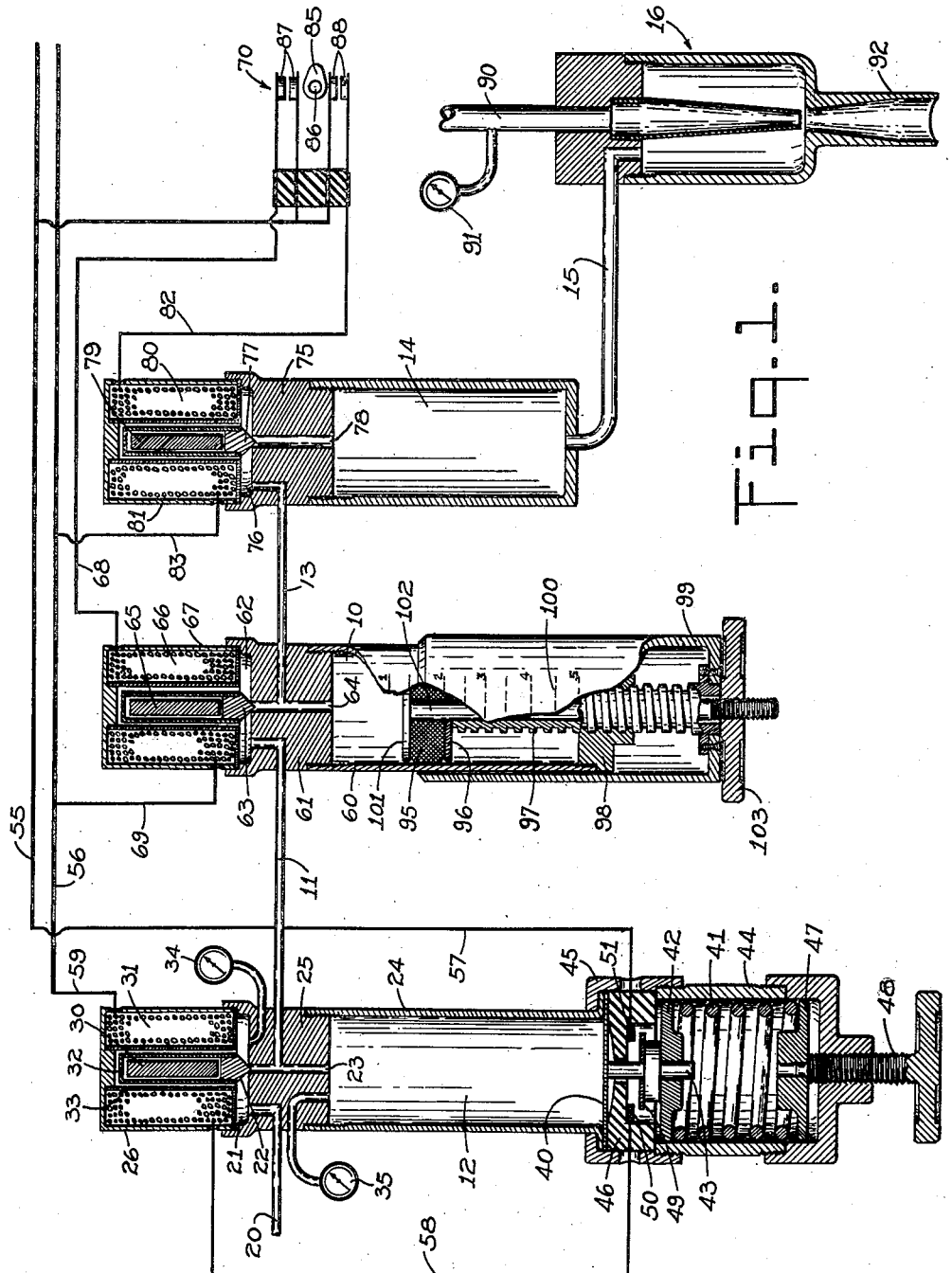

Oct. 22, 1940.   R. W. SPARLING   2,218,773
APPARATUS FOR SUPPLYING GAS
Filed Aug. 20, 1936   2 Sheets-Sheet 1

INVENTOR
Raymond W. Sparling
BY
his ATTORNEY

Oct. 22, 1940.    R. W. SPARLING    2,218,773
APPARATUS FOR SUPPLYING GAS
Filed Aug. 20, 1936    2 Sheets-Sheet 2
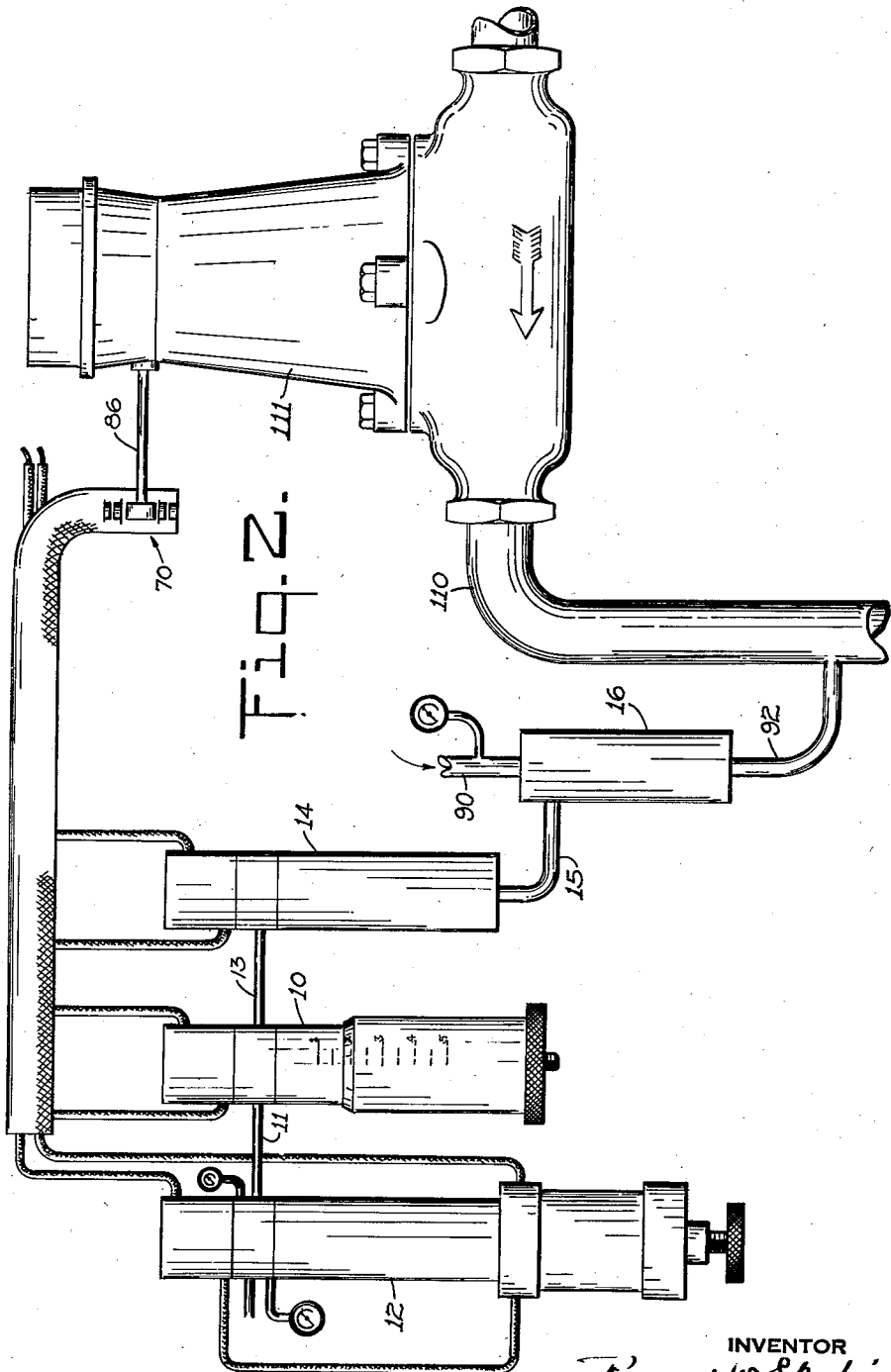

Patented Oct. 22, 1940

2,218,773

UNITED STATES PATENT OFFICE 2,218,773

APPARATUS FOR SUPPLYING GAS

Raymond W. Sparling, South Pasadena, Calif., assignor to Wallace & Tiernan Company, Inc., Belleville, N. J., a corporation of New York Application August 20, 1936, Serial No. 96,982

6 Claims. (Cl. 210—28)

This invention relates to apparatus for supplying gas at a controlled rate. More particularly, the invention relates to a feeding and metering apparatus including means by which measured volumes of gas are delivered periodically; and the invention aims generally to provide an improved apparatus of this kind which will supply gas at accurately controlled rates and, for a given size apparatus, over a wide range of flow, and which is capable of supplying gas at relatively low rates of flow without loss of accuracy of control, and which is comparatively simple in construction, reliable in operation, and not likely to get out of order.

To these ends, an apparatus according to the invention comprises a measuring chamber to which gas at a constant predetermined pressure is admitted under control of a valve which is operated to admit the gas to the chamber periodically to fill the chamber to said predetermined pressure. After each filling of the chamber, gas is withdrawn therefrom through an outlet passage leading to a chamber or space from which the gas is withdrawn, the outlet passage being controlled by a valve which is operated to open the passage periodically after each filling of the measuring chamber. In a preferred embodiment of the invention, the valves controlling the admission of gas to the measuring chamber and the discharge of gas therefrom are electrically operated by electromagnetic means connected in circuits which include circuit controlling means cam-operated from a shaft the speed of rotation of which determines the periodicity of the filling and discharging of the measuring chamber, and, therefore, of the rate of supply of the gas; and the valve-controlled outlet passage discharges into a receiving chamber from which the gas is drawn by a constantly acting suction device which for the purpose for which the invention has been especially made is a water aspirator. The invention includes also an electrically operated pressure reducing and regulating valve for reducing the pressure of gas supplied from a pressure source and supplying it to the measuring chamber at the desired constant pressure, and which is adjustable for varying such constant pressure.

The circuit-controlling cam shaft may be driven at a constant speed which may be adjustable for varying the rate of supply of the gas. The invention has been made with the idea of providing apparatus for feeding chlorine gas and for dissolving the gas in a minor stream of water which is then discharged into the water or other liquid to be treated. When the chlorine solution thus produced is used for treating flowing water, it is desirable that the rate of supply of the chlorine be varied proportionately to variation in the amount of water flowing. The present apparatus is particularly well adapted for giving such a proportionately varied supply of the chlorine, or, as it might be, of any other gas, since this may be accomplished simply by driving the circuit-controlling cam shaft at a speed which varies proportionately to the rate of flow of the water being treated.

As a further means for varying the rate of supply of the gas, the measuring chamber is made adjustable in volumetric capacity, and this adjustment of the capacity of the measuring chamber serves as a means for varying the dosage when the shaft which determines the periodicity of filling and discharging the measuring chamber is driven at a speed varying with variations in rate of flow of the treated liquid. The rate at which gas is supplied by the apparatus of the invention may also be varied in a third way, that is, by varying the difference between the pressure at which the measuring chamber is charged and the pressure to which it is exhausted.

A full understanding of the invention can best be given by a detailed description of apparatus embodying the various features of the invention in the form now considered best, and such a description will now be given in connection with the accompanying drawings illustrating such apparatus, and in which:

Fig. 1 is a somewhat diagrammatic sectional view of an approved apparatus according to the invention intended especially for supplying chlorine gas; and Fig. 2 is a view showing the apparatus in elevation and showing means for driving the circuit-controlling cam shaft at a rate which varies proportionately to variations in the rate of flow of water being treated.

Referring to the drawings, in the apparatus shown the chlorine gas is supplied at a constant pressure to a measuring chamber 10 through a tube 11 from a constant pressure chamber 12 and is discharged from the measuring chamber through a tube 13 to a receiving chamber 14 from which gas is withdrawn through tube 15 by a water aspirator 16.

Any suitable means may be provided for supplying the gas at a constant pressure to the measuring chamber. Most desirably, however, the electrically operated pressure reducing and regulating device which forms a feature of the invention and an approved form of which is shown in Fig. 1 is used. As shown, chlorine gas from a suitable source of supply under pressure, such as a tank of compressed liquefied chlorine, flows through a tube 20 to a space or chamber 21 from which, when permitted by a valve 22, gas flows through a port 23 to the chamber 12. The chamber 12 is formed by a short length of tubing 24 having a headpiece 25 which is screwed into the upper end of the tube and is flanged at its upper end to receive a solenoid casing 26. The space between the bottom of the solenoid casing and the top of the headpiece 25 forms the chamber 21, and the headpiece is bored to form the port 23 and to provide a connection from the gas supply tube 20 to the chamber 21 and an outlet port leading to the supply tube 11.

The valve 22 seats at the upper end of the port 23 and is operated by means of a core, or armature, 30 mounted within a solenoid coil 31. In order to provide for lost motion between the valve and the core and the resulting hammer action of the core on the valve, the core is mounted to move freely within a casing 32 which is closed at its upper end and carries the valve 22 at its lower end and is of inside length slightly greater than the length of the core. The casing 32 is mounted to move freely within a tube 33 within the coil 31, the tube 33 and the casing 32 being of non-magnetic material. The casing or shell 26 is of magnetic material and encloses the coil 31 in the usual manner. Pressure gages 34 and 35 are desirably provided for showing, respectively, the pressure in the chamber 21 and in the chamber 12.

The bottom of the chamber 12 is formed by a metal diaphragm 40. A spring 41 acting through a disc 42 and pin 43 tends to move the diaphragm upward against the gas pressure within the chamber 12. The spring is mounted within a tubular housing 44 which is secured to the flanged lower end of the tube 24 by a union nut 45 by which the diaphragm is clamped between the flanged end of the tube 24 and a member of insulating material 46. The lower end of spring 41 rests on a disc 47 supported and adjustably positioned by means of a thumb screw 48. By turning the screw the upward force exerted by the spring against the diaphragm 40 may be increased or decreased as desired. A metal disc 49 is carried by the push pin 43 in position to engage two contact terminals 50 and 51 when the push pin moves the diaphragm 40 upward, these contact terminals being carried by the insulating member 46.

The solenoid 31 and the contact terminals 50 and 51 are connected in series across supply conductors 55 and 56 extending from any suitable source of electric current, the connecting circuit including conductors 57, 58 and 59. The operation of this pressure reducing and regulating device is as follows: When the gas pressure in the chamber 12 is less than that for which the spring 41 is adjusted, the diaphragm 40 is raised by the pressure of the spring and the solenoid is energized by the closing of the circuit by the disc 49, and the valve 22 is raised and held in open position, permitting gas to enter the chamber 12 until the pressure in the chamber is sufficient to depress the diaphragm 40 against the force of the spring 41. By the downward movement of the diaphragm, the circuit is broken and the valve closes, cutting off the supply of gas to the chamber. Gas is thus supplied to the chamber whenever the pressure in the chamber drops below the predetermined pressure, and the supply of gas is cut off whenever the pressure rises above the predetermined pressure, constant pressure thus being maintained in the chamber the value of which is determined by the setting of the thumb screw 48.

The measuring chamber 10 in the apparatus shown is formed like the constant pressure chamber 12 of a short length of tubing 60 having a headpiece 61 similar to the headpiece 25 and formed to provide a space or chamber 62 into which gas flows from the chamber 12 through connecting tube 11 and from which, when permitted by a valve 63, gas flows through a port 64 into the chamber 10. The valve 63 is an electrically operated valve similar to the valve 22, being normally seated at the upper end of the port 64 and operated by an armature 65 within a solenoid coil 66 cased within a shell 67 mounted on the headpiece 61, these parts being as more particularly described in connection with the valve 22. The solenoid 66 is supplied with current from the supply conductors 55 and 56 through conductors 68 and 69, the supply being controlled to energize the solenoid periodically by a circuit-controlling device 70. When the solenoid 66 is energized, the valve is raised to permit gas from the constant pressure chamber 12 to flow into the chamber 10, and when the solenoid is de-energized, the valve falls to its closed position, preventing inflow of gas to chamber 10.

The receiving chamber 14 is also shown as of cylindrical form and having a headpiece 75 similar to the headpieces 25 and 61 providing a space 76 into which gas flows from the chamber 10 through connecting tube 13 and from which gas flows through port 78 into the chamber 14 when permitted by a valve 77. The valve 77 is an electrically operated valve similar to the valves 22 and 63, being operated by armature 79 within a solenoid coil 80 cased within a shell 81 mounted on the headpiece 75, the construction being as more particularly described in connection with valve 22. The solenoid 80 is supplied with current from the supply conductors 55 and 56 through conductors 82 and 83, and the solenoid circuit is controlled by the circuit controlling device 70 to energize the solenoid periodically and in alternation with the energizing of the solenoid 66. When the valve 77 is raised, gas is permitted to flow from the measuring chamber 10 into the chamber 14, and when the solenoid is deenergized the valve falls to its closed position and outflow of gas from the measuring chamber is prevented.

The circuit controlling device 70 as shown comprises a cam 85 on a shaft 86 and two contact pairs 87 and 88 positioned to be operated alternately by the cam to close circuit. The contact pair 87 is connected in series in the circuit to the solenoid 66 across the conductors 55 and 56, and the contact pair 88 is connected in series in a similar circuit to the solenoid 80. The shaft 86 may be driven by any suitable means and its speed of rotation varied manually or automatically, one means for driving the shaft and varying its speed automatically being shown in Fig. 2.

The water aspirator 16 may be of any suitable construction to serve as a suction device for drawing gas from the receiving chamber 14 through connecting pipe 15. It is operated by water supplied through pipe 90 under pressure as indicated by gage 91, and discharges the water with the entrained gas in solution through pipe 92.

When the apparatus is in operation, the shaft 86 is rotated and water under pressure is supplied through pipe 90 to the aspirator. By rotation of the cam 85 the valve-operating solenoids 66 and 80 are energized to raise their respective valves 63 and 77 periodically and alternately, each valve being closed during all the time that the other valve is open. When the contact pair 87 is operated by the cam to close circuit to the solenoid 66, the valve 63 is raised to permit gas from the constant pressure supply chamber 12 to flow into the measuring chamber 10 to fill said chamber to the predetermined pressure at which gas is maintained in the chamber 12. Then after the solenoid 66 has been deenergized to permit the valve 63 to close, contact pair 88 is operated by the cam to close the circuit to solenoid 80 and valve 77 is thereby raised to permit gas from the measuring chamber to flow into the receiving chamber 14 which, in the construction shown, is constantly under suction of the aspirator 16. The solenoid 80 is deenergized and the valve 77 permitted to close before the next opening of the valve 63. The measuring chamber 10 will thus be periodically charged with gas supplied from chamber 12 at a constant pressure, and after each charging operation gas will be withdrawn from the chamber 10 into the receiving chamber 14 from which gas is constantly being withdrawn by the aspirator. The gas sucked in by the aspirator goes into solution in the water flowing through the aspirator and is discharged through the pipe 92. Thus at each rotation of the shaft 86 a measured volume of gas will be supplied by the apparatus and dissolved in the flow of water passing through the aspirator.

The rate at which the gas is supplied by the apparatus may be varied by varying the speed of rotation of the shaft 86. The rate of supply may also be varied by adjusting the pressure under which gas is supplied to the measuring chamber or by varying the capacity of the measuring chamber, to vary the amount of gas passed at each cycle of operations. The pressure at which the gas is supplied to the measuring chamber may, as has been stated, be varied by adjusting the thumb screw 48 to increase or decrease the force exerted by the spring 41 on the diaphragm 40.

For adjustably varying the capacity of the measuring chamber, the chamber is provided with an adjustable bottom formed by a disc 95 of suitable flexible material such as soft rubber seated on a plate 96 carried by a hollow screw rod 97 which extends through a threaded opening in an end piece 98 secured in the lower end of the chamber tube 60, and the lower flanged end of which rod is secured to an inwardly extending flange at the bottom of a sleeve or tube 99 which is slidably sleeved on the tube 60. The disc 95 may thus be moved up or down to vary the capacity of chamber 10 by turning the sleeve 99, and the relation between the upper end of sleeve 99 and calibration markings 100 on the tube 60 will indicate the capacity of the measuring chamber for any adjusted position of the sleeve.

In order to insure a gas-tight seal between the disc 90 and the chamber wall, a pressure disc 101 to bear against the upper side of the rubber disc 95 is provided carried by a rod 102 which extends through the hollow screw rod 97 and has its lower end threaded and extending through the threaded opening in a hand wheel 103. The hand wheel bears against the flanged bottom of the sleeve 99 so that by turning the hand wheel with relation to the sleeve the rod 102 may be drawn down to compress the disc 95 between the plate 96 and the disc 101, or by turning the hand wheel in the other direction the rod and disc 101 may be moved upward to relieve the pressure on the disc 95. When it is desired to change the capacity of the measuring chamber, the hand wheel is first unscrewed to relieve the compression on the disc 95 to permit it to contract diametrically. The sleeve 99 is then turned to position the disc 95 for the desired chamber capacity, and then the hand wheel 103 is turned relatively to the sleeve 99 to compress the disc 95 and expand it against the chamber wall.

Fig. 2 shows the apparatus connected for supplying chlorine to water flowing through a conduit 110, and means for driving the cam shaft 86 at a speed which is automatically varied to vary the rate of supply of chlorine according to variations in quantity of water flowing through the conduit. For this purpose a water meter 111 connected in the conduit serves as a motor for driving the shaft 86. As the quantity of water flowing through the conduit varies, the speed of the meter will vary correspondingly, and this will cause corresponding variation in the speed of rotation of the cam shaft 86 and, therefore, of the rate at which the chlorine gas is supplied to the aspirator 16 to be carried by the stream of water flowing through the aspirator into the main stream of water to be treated flowing through the conduit 110. The dosage, or ratio between the amount of chlorine supplied and the quantity of water treated, may be varied by adjusting the size of the measuring chamber 10 or by varying the pressure maintained in the constant pressure chamber 12.

What is claimed is:

1. Apparatus for supplying gas at a controlled rate, comprising a constant volume measuring chamber, means for periodically charging the measuring chamber with gas to a predetermined pressure, means for withdrawing gas from the measuring chamber after each charging thereof and thereby lowering the pressure in said chamber, and means for varying the size of the measuring chamber to vary the rate of gas supply.

2. Apparatus for supplying gas at a controlled rate, comprising a constant volume measuring chamber, means for periodically charging the measuring chamber with gas to a predetermined pressure, and suction means for withdrawing gas from the measuring chamber after each charging thereof and thereby lowering the pressure in said chamber.

3. Apparatus for supplying gas at a controlled rate, comprising a constant volume measuring chamber, means for periodically charging the measuring chamber with gas to a predetermined pressure, a receiving chamber, suction means for withdrawing gas from the receiving chamber to reduce the pressure therein below said predetermined pressure, a conduit between said chambers, a valve controlling said conduit, and means independent of the pressure in the measuring chamber for operating said valve periodically to permit gas to flow from the measuring chamber to the receiving chamber after each charging of the measuring chamber, said valve being closed during the charging of the measuring chamber.

4. Apparatus for supplying gas at a controlled rate, comprising a constant volume measuring chamber, means for supplying gas thereto at a substantially constant pressure, a valve for controlling the admission of the gas to said chamber, a conduit for permitting gas to flow from said chamber at a pressure lower than said supply pressure, a valve controlling said conduit, and means independent of the pressure in said chamber for periodically operating said valves alternately to fill the chamber with gas at the supply pressure and to permit gas to flow from said chamber, the second said valve being closed when the first said valve is open.

5. Apparatus for supplying treating gas to flowing water, comprising a constant volume measuring chamber, means for supplying gas thereto at a substantially constant pressure, a valve for controlling the admission of the gas to said chamber, a water aspirator for withdrawing gas from said chamber and discharging into the flowing water, a valve for controlling the flow of gas from said chamber, means independent of the pressure in said chamber for periodically operating said valves alternately for admitting to said chamber gas so supplied to fill the chamber with gas at the supply pressure and for permitting gas to flow from the chamber to the aspirator, the second said valve being closed when the first said valve is open, and means controlled by the flowing water for varying the periodicity of the operation of said valves for varying the rate of supply of gas to the aspirator to maintain for varying rates of flow of the water a fixed ratio between the rate of supply of the gas and the rate of flow of the water.

6. Apparatus for supplying treating gas to flowing water, comprising a constant volume measuring chamber, means for supplying gas thereto at a substantially constant pressure, a valve for controlling the admission of the gas to said chamber, a water aspirator for withdrawing gas from said chamber and discharging into the flowing water, a valve for controlling the flow of gas from said chamber, means independent of the pressure in said chamber for periodically operating said valves alternately for admitting to said chamber gas so supplied to fill the chamber with gas at the supply pressure and for permitting gas to flow from the chamber to the aspirator, the second said valve being closed when the first said valve is open, means controlled by the flowing water for varying the periodicity of the operation of said valves for varying the rate of supply of gas to the aspirator to maintain for varying rates of flow of the water a fixed ratio between the rate of supply of the gas and the rate of flow of the water, and means for adjustably varying the capacity of the measuring chamber for varying the dosage.

RAYMOND W. SPARLING.